United States Patent [19]
Allen et al.

[11] Patent Number: 5,634,058
[45] Date of Patent: May 27, 1997

[54] DYNAMICALLY CONFIGURABLE KERNEL

[75] Inventors: Tom Allen, Marlborough; Joseph E. Provino, Cambridge; William F. Pittore, Lexington, all of Mass.

[73] Assignee: Sun Microsystems, Inc., Mountain View, Calif.

[21] Appl. No.: 540,875

[22] Filed: Oct. 11, 1995

Related U.S. Application Data

[63] Continuation of Ser. No. 893,337, Jun. 3, 1992, abandoned.
[51] Int. Cl.⁶ ................................................. G06F 9/445
[52] U.S. Cl. ............... 395/712; 364/280.8; 364/280.2; 364/975.4; 364/975.2; 395/685
[58] Field of Search ............................................ 395/700

[56] References Cited

U.S. PATENT DOCUMENTS

| | | | |
|---|---|---|---|
| 4,445,190 | 4/1984 | Pierschalla et al. | 364/900 |
| 4,787,034 | 11/1988 | Szoke | 364/300 |
| 5,175,828 | 12/1992 | Hall et al. | 395/375 |
| 5,226,160 | 7/1993 | Waldron et al. | 395/660 |
| 5,247,678 | 9/1993 | Littleton | 395/700 |
| 5,291,601 | 3/1994 | Sands | 395/700 |
| 5,303,376 | 4/1994 | Taki | 395/700 |
| 5,303,392 | 4/1994 | Carney et al. | 395/775 |

OTHER PUBLICATIONS

Software Practice & Experience, vol. 21, No. 4, Apr. 1991, Chichester, GB; pp. 375–390 XP147180 W. Wilson Ho et al.: "An Approach to Genuine Dynamic Linking" *abstract* *p. 379, line 35—p. 384, line 13; figures 2,3.

Dr. Dobb's Journal of Software Tools, vol. 15, No. 5, May 1990, US; pp. 30–109 Gary Syck: "Dynamic Link Libraries for DOS" *p. 30, middle col. line 7—p. 32, left col., line 13* *p. 36, left col., line 10—p. 39, left col., line 1*.

Proceedings of the Spring 1990 EUUG Conference, 23 Apr. 1990, Munich, DE, pp. 133–138; Dieter Konnerth et al.: "Dynamic Driver Loading for Unix System V" *p. 133, line 27–line 32* *p. 135, line 8–line 40* *p. 136, line 1–line 39.

Peacock, Dynamic Shared Libraries, UNIX Review, May 1991, V 9, n 5 P37(6).

Wirth et al, The Oberon System, Software Practice and Experience, vol. 19(9), Sep. 1989 pp. 857–893.

*Primary Examiner*—Kevin A. Kriess
*Assistant Examiner*—Lucien Toplu
*Attorney, Agent, or Firm*—Blakely Sokoloff Taylor & Zafman LLP

[57] ABSTRACT

A dynamically configurable operating system is achieved by providing a module sub-system which intercepts requests by processes to access a module in the operating system and determines whether the module has been loaded in the kernel memory and linked the other modules located in the kernel memory and installed in the appropriate table. If the module has been into the kernel memory, and installed the module sub-system grants the requesting installed process access to the module and processing continues. If the module has not been loaded into the kernel memory, the module sub-system will retrieve a copy of the module stored and copy it into kernel memory. The module is then linked to the other modules located in the kernel and installed. Once the module is loaded and linked and installed, access is granted to the requesting process and normal processing continues.

18 Claims, 16 Drawing Sheets

```
struct mod_modinfo {
        char                *modm_module_name;
        struct mod_stub_info    modm_stubs[1];
};

struct mod_stub_info {
        unsigned int        mods_func_adr;
        struct mod_modinfo  *mods_modinfo;
        unsigned int        mods_stub_adr;
        int                 (*mods_errfcn) ();
        int                 mods_weak;
};
```

FIG. 6B

```
#define MODULE (module, namespace) \
        .seg     ".data"; \
module/**/_modname:  \
        .ascii   "namespace/module" ; \
        .byte    0; \
        .align   4; \
module/**/_modinfo: ; \
        .word module/**/_modname; \
        word 0       /*storage for modctl pointer*/

/*then stub_info structures follow until a mods_func_adr
        is 0 */

/*this puts a 0 where the next mods_func_adr would be*/
define END_MODULE(module)  .word 0 define STUB(module, fcnname, retfcn)  STUB_COMMON(module, fcnname,
                                \ mod_hold_stub, retfcn, 0)

/* "weak stub", don't load on account of this call*/
#define WSTUB(module, fcnname, retfcn) STUB_COMMON(module, fcnname,
                                \ retfcn, retfcn, 1)
```

FIG. 6C-1

```
#define STUB_COMMON(module, fcnname, install_fcn, retfcn, weak) \
        .seg        ".text"; \
        .global  fcnname; \
fcnname: \
        save        %sp,-SA(MINFRAME), %sp; /*new window*/ \
        sethi %hi(fcnname/**/_info), %l5, \
        or          %l5, %lo(fcnname/**/_info), %l5; \
        ld          [%l5+0x10], %l1;      /*weak??*/ \
        cmp         %l1, 0; \
        be,a        1f;                    /*not weak*/ \
        restore; \
        ld          [%l5+0xc], %l1;       /*yes, installed??*/ \
        ld          [%l5], %l0; \
        cmp         %l1, %l0; \
        bne,a       1f;                    /*yes, so do the mod_hold thing*/ \
        restore; \
        mov         %l0, %g1; \
        jmpl        %g1, %g0;              /*no, just jump to retfcn*/ \
        restore; \

1: \
        sub         %fp, %sp, %g1;   /* get size of callers stack frame */ \
        neg         %g1; \
        save        %sp, %g1, %sp;   /* create new frame same size */ \
        move              %g1, %l4; \
        sethi %hi(stubs_common_code), %g1; \
        or          %g1, %lo(stubs_common_code), %g1; \
        sethi %hi (fcnname/**/_info), %l5; \
        jmpl        %g1, %g0; \
        or  %l5, %lo(fcnname/**/_info), %l5; \
        .seg ".data"; \
        .align  4; \
fcnname/**/_info: \
        .word       install_fcn; \
        .word       module/**/_modinfo; \
        .word       fcnname; \
        .word       retfcn; \
        .word       weak
```

FIG. 6C-2

```
/*
 * We jump here with the fcnname_info pointer in 15
 * and the frame size in %l4.
 */
stubs_common_code:

mov     %sp, %l0;
        neg     %l4;
        cmp     %l4, 0x40;          /*If stack isn't any bigger than 0x40 */
        ble,a   2f;
        mov     %l5, %o0;
        sub     %l4, 0x40, %l4;     /*skip locals and outs*/
        add     %l0, 0x40, %l0;
        add     %fp, 0x40, %l1;     /*get original sp before save*/
1:
        ldd     [%l1], %l2;
        inc     8, %l1;
        std     %l2, [%l0];
        deccc   8, %l4;
        bg,a    1b;
        inc     8, %l0;
2:
        call    mod_hold_stub;      /*Hold the module */
        mov     %l5, %o0;
        cmp     %o0, 0xffffffff;    /* If error then return error */
        bne,a   1f;
        mov     %o0, %l0;
        ld      [%l5+0xc], %i0;
        ret;
        restore;
1:
        ld      [%l5] , %g1;
        mov     %i0, %o0;           /* copy over incoming args, if number of */
        mov     %i1, %o1;
        mov     %i2, %o2;
        mov     %i3, %o3;
        mov     %i4, %o4;
        jmpl    %g1, %o7;           /*jump to the stub function*/
        mov     %i5, %o5;
        mov     %o0, %i0;           /*copy any return values*/
        mov     %o1, %i1;           /args is >6 then we copied them above */
        mov     %l5, %o0;
        call    mod_release_stub;   /*release hold on module*/
        mov     %l0, %o1;
        ret;                        /*return to caller*/
        restore;
```

FIG. 6C-3

```
struct modlinkage {
        int     ml_rev;
        void    *ml_linkage[4];
structures */
};
```

FIG. 7A

```
/*
 * Definitions for the module specific linkage structures.
 * The first two fields are the same in all of the structures.
 * The linkinfo is for informational purposes only and is returned by
 * modctl with the MODINFO cmd. The rest of the fields are module
specific.
*/

/* For drivers. For an example, see sun/io/sle.c. */
struct modldrv {
        struct mod_ops          *drv_modops;
        char                    *drv_linkinfo;
        struct dev_ops          *sys_dev_ops;
};
/* For system calls. For an example, see common/os/acct.c. */
struct modlsys {
        struct mod_ops          *sys_modops;
        char                    *sys_linkinfo;
        struct sysent           *sys_sysent;

/* For filesystems. For an example, see common/fs/ufs/ufs_vfsops.c*/
struct modlfs {
        struct mod_ops          *fs_modops;
        char                    *fs_linkinfo;
        struct vfssw            *fs_vfssw;
};

/* For Streams Modules. For an example, see common/io/ldterm.c*/
struct modlstrmod {
        struct mod_ops          *strmod_modops;
        char                    *strmod_linkinfo;
        struct fmodsw           *strmod_fmodsw;
};
```

FIG. 7B-1

```
/* For Scheduling classes.  For an example, see common/disp/ts.c.*/
struct modlsched {
        struct mod_ops          *sched_modops;
        char                    *sched_linkinfo;
        struct class            *sched_class;
};

/*
 * For Exec file type (like COFF, . . .).
 * For an example, see common/exec/elf/elf.c
 */
struct modlexec {
        struct mod_ops          *exec_modops;
        char                    *exec_linkinfo;
        struct execsw           *exec_execsw;
};

/*
 * For miscellaneous modules that don't fit into the other types.
 * For an example, see sun/os/swapgeneric.c.
 */
struct modlmisc {
        struct mod_ops          *misc_modops;
        char                    *mosc_linkinfo;
};
```

FIG. 7B-2

```
extern struct vfsops devfs_vfsops;
extern devfsinit();

/*
*This is a template of a vfssw entry. As part of module installation,
*a vfssw slot is allocated and this structure is copied into it.
*/ static struct vfssw vfw = {
      "devfs",
      devfsinit,
      &devfs_vfsops,
      0
};

extern struct mod_ops mod_fsops;

static struct modlfs modlfs = {
      &mod_fsops, "device filesystem", &vfw
};

static struct modlinkage modlinkage = {
      MODREV_1, &modlfs, NULL
};

_init()
{
      return (mod_install (&modlinkage));
}

_fini()
{
      return (mod_remove (&modlinkage));
}

_info(modinfo)
      struct modinfo *modinfo;
{
      return (mod_info (&modlinkage, modinfo));
}
```

FIG. 8

```
#include <sys/types.h>
#include <sys/param.h>
#include <sys/sysmacros.h>
#include <sys/cred.h>
#include <sys/errno.h>
#include <sys/conf.h>
include <sys/sunddi.h> include <sys/modctl.h> extern nodev ();
extern struct  dev_ops test_ops;
extern struct mod_ops mod_driverops;

static struct modldrv modldrv = {
      &mod_driverops          /* Type of module.  This one is a driver */
      "test driver",      /* Name of module. */
      &test_ops,              /* driver ops */
};

static struct modlinkage modlinkage = {
      MODREV_1, &modldrv, NULL
};

static int mod_keepcnt;

_init ()
{
      return (mod_install (&modlinkage));
}

_fini ()
{ return (mod_remove (&modlinkage));
}

_info (modinfop)
        struct modinfo *modinfop;
{
      return (mod_info (&modlinkage, modinfop));
}
```

FIG. 9A

```
static int tst_identify ();
static int tst_attach ();
static dev_info_t *tst_info();
static dev_info_t *tst_devi;
static int tst_open ();
static int tst_close ();
static int tst_ioctl ();
static int tst_mmap ();

struct cb_opstst_cb_ops = { tst_open,            /* open */
    tst_close,           /* close */
    nodev,               /* strategy */
    nodev,               /* print */
    nodev,               /* dump */
    nodev,               /* read */
    nodev,               /* write */
    tst_ioctl,           /* ioctl */
    tst_mmap,            /* mmap */
    nodev,               /* segmap */
    nochpoll,            /* poll */
    ddi_prop_op,         /* prop_op */
    0,                   /* streamtab */
    D_NEW                /* Driver compatibility flag */

};

struct dev_opstest_ops = {

DEVO_REV,            /* devo_rev, */
    0,                   /* refcnt */
    tst_info             /*get dev_info */
    tst_identify,             /* identify */
    nulldev,             /* probe */
    tst_attach,               /* attach */
    nulldev,             /* detach */
    nulldev,             /*reset */
    &tst_cb_ops,         /* driver operations */
     (struct bus_ops *)0  /* bus operations */

```
static int ntst;

static
tst_identify (dev_info_t *devi)
{
        char *name;

name = ddi_get_name(devi);

/*

* For this test driver, the name "auxiliary-io" is used
        * because this is one of hte device nodes on a SPARCstation
        */ that does not have a driver already.
        */
        if (strcmp(name, "auxiliary-io") == 0) {
            ntst++;
            printf("tst_identify: %s, *IDENTIFIED*\n", name);
            return (DDI_IDENTIFIED);

}
        printf("tst_identify: %s\n", name);
        return (DDI_NOT_IDENTIFIED);
} static
tst_attach(dev_info_t *devi)
{
        printf("tst_attach\n");
        tst_devi = devi;
        return (1);
}
```

FIG. 9C

```
static dev_info_t *
tst_info (dev_info_t *dip, ddi_info_cmd_t infocmd, void *arg, void
**result)
{
        register dev_t dev = (dev_t) arg;
        register int error;

switch (infocmd) {
        case DDI_INFO_DEVT2DEVINFO:
                if (tst_devi == NULL)
                        error = DDI_FAILURE;
                else {
                        *result = (void *)tst_devi;
                        error = DDI_SUCCESS;
                }
                break;
        case DDI_INFO_DEVT2INSTANCE:
                *result = (void *)0;
                error = DDI_SUCCESS;
                break;
        default:
                error = DDI_FAILURE;
        }
        return (error);
}
```

FIG. 9D

```
/*ARGSUSED*/
tst_open(dev_t *devp, int flag, int otyp, struct cred *cred)
{
        printf("tst_open\n");
        mod_keepcnt++;  /* reason to disallow unload */
        return (0);
} tst_close(dev_t dev, int flag, int otyp, struct cred *cred)
{
        printf("tst_close\n");
        mod_keepcnt = 0;  /* only called on last close */
        return 0;
} tst_mmap(dev_t dev, off_t off, off, int prot)
{
        printf("tst_mmap\n");
}
tst_ioctl (dev_t dev,int cmd,caddr_t data,int flag,struct cred

*cred,int *rvalp)
{
    printf("tst_ioctl\n");
    return 0;
}
```

FIG. 9E

DYNAMICALLY CONFIGURABLE KERNEL

This is a continuation of application Ser. No. 07/893,337, filed Jun. 3, 1992, now abandoned.

BACKGROUND OF THE INVENTION

1. Field of the Invention:

The present invention relates to dynamically configurable kernels. More specifically, the present invention relates to a system for automatically loading modules of a kernel on an as needed basis.

2. Art Background:

One central component of a computer system is its operating system kernel. The kernel typically consists of a plurality of modules such as drivers, including streams drivers and device drivers, file system modules, scheduling classes, streams modules, and system calls. These modules are compiled and subsequently linked together to form the kernel. Subsequently, when the system is started or "booted up", the kernel is loaded into memory. However, as technology progresses and more sophisticated and complex modules providing more functionality are generated, and new modules are created, the amount of memory required to store the kernel dramatically increases.

One technique to overcome the memory limitations of the computer system is a pageable kernel. A paging mechanism is implemented in which the kernel memory will be paged or swapped to a disk according to memory usage of the kernel memory. However, it has been found that a substantial portion of the kernel is not pageable and the difficulty in partitioning the kernel into pageable portions far outweighs any potential benefit.

Computer systems are typically statically configured for each projected type of use of the computer. Some computers are employed for tasks which may only require the basic modules. Other computers may be utilized for sophisticated processing and require additional modules. However, the task of configuring or reconfiguring a kernel is not simple and it is typically beyond the skill of a typical user.

In the present invention, virtual kernel functionality is provided. This is achieved by providing modules in the kernel memory on demand and on an as needed basis. Thus, a minimum set of modules is loaded initially into the kernel and the remaining modules are added only when needed. This has been found to dramatically decrease the amount of memory required for the kernel as typically most users of a computer system do not require all the modules available. Furthermore, this technique avoids the need to reconfigure, i.e., (rebuild the kernel) if any of the modules to be loaded into the kernel are changed.

Although it is well known in the art that drivers can be loaded by a user by expressly executing commands to load a driver module, this does not provide for automatically loading modules on an as needed basis to minimize the amount of memory required to maintain the kernel.

SUMMARY OF THE INVENTION

The system of the present invention sets forth a system for providing virtual kernel functionality. Each module is separately compiled into an executable image. These modules are placed in storage until requested by the kernel. The system configuration tables provided in the kernel memory are utilized to determine that either a module is located in the kernel or a module is not located in the kernel and therefore needs to be loaded into the kernel memory and linked with the modules already loaded in to the kernel memory. Virtual functionality is provided by detecting requests to access the module configuration tables when a module is referenced, intercepting the request for access in order to determine whether or not the module is located in the memory. If the module is not in the kernel memory, procedures are executed to load the module into the kernel memory, dynamically link the module with the modules residing in the kernel memory and install the module into the appropriate configuration table such that subsequent accesses will indicate that the module is loaded and installed in the kernel.

BRIEF DESCRIPTION OF THE DRAWINGS

The objects, features and advantages of the present invention will be apparent from the following detailed description of the invention in which:

FIG. 6b illustrates stub data structures and FIG. 6c illustrates macros used to generate the data structures.

FIG. 7a illustrates an exemplary linkage structure and FIG. 7b sets forth different types of linkage structures.

FIG. 8 illustrates an exemplary wrapper for a file system module.

FIG. 9 illustrates an exemplary character driver configured to operate in accordance with the system of the present invention.

DETAILED DESCRIPTION OF THE INVENTION

In the following description for purposes of explanation, specific memories, organizations, architectures, data rates, etc. are set forth in order to provide a thorough understanding of the present invention. However, it will be apparent to one skilled in the art that the present invention may be practiced without these specific details. In other instances, well known circuits or hardware are shown in block diagram form in order not to obscure the present invention unnecessarily.

The dynamically configurable operating system of the present invention is described below with respect to the UNIX® operating system (UNIX is a registered trademark of AT&T). It will be obvious to one skilled in the art in view of the following description that the present invention is not limited as such and may be applied to other operating systems.

A two step process for dynamically configuring the kernel is disclosed. The set of system configuration tables located in the kernel are utilized to identify the state of a module. When a module is called or referenced, the configuration table for that module type is examined to determine whether the module is installed. If the module is not installed, the module is loaded and installed whereby the configuration table updated accordingly.

In order to provide an accessible module in the kernel, the module is loaded and installed into the kernel. During the loading process, virtual and physical memory is reserved for the module. The module is written into physical memory, the module is relocated to its linked virtual address and all symbol references are resolved. During installation, the module is connected into the appropriate configuration table such that an entry in the table for the module is allocated and filled in with the appropriate information.

Figure 1:
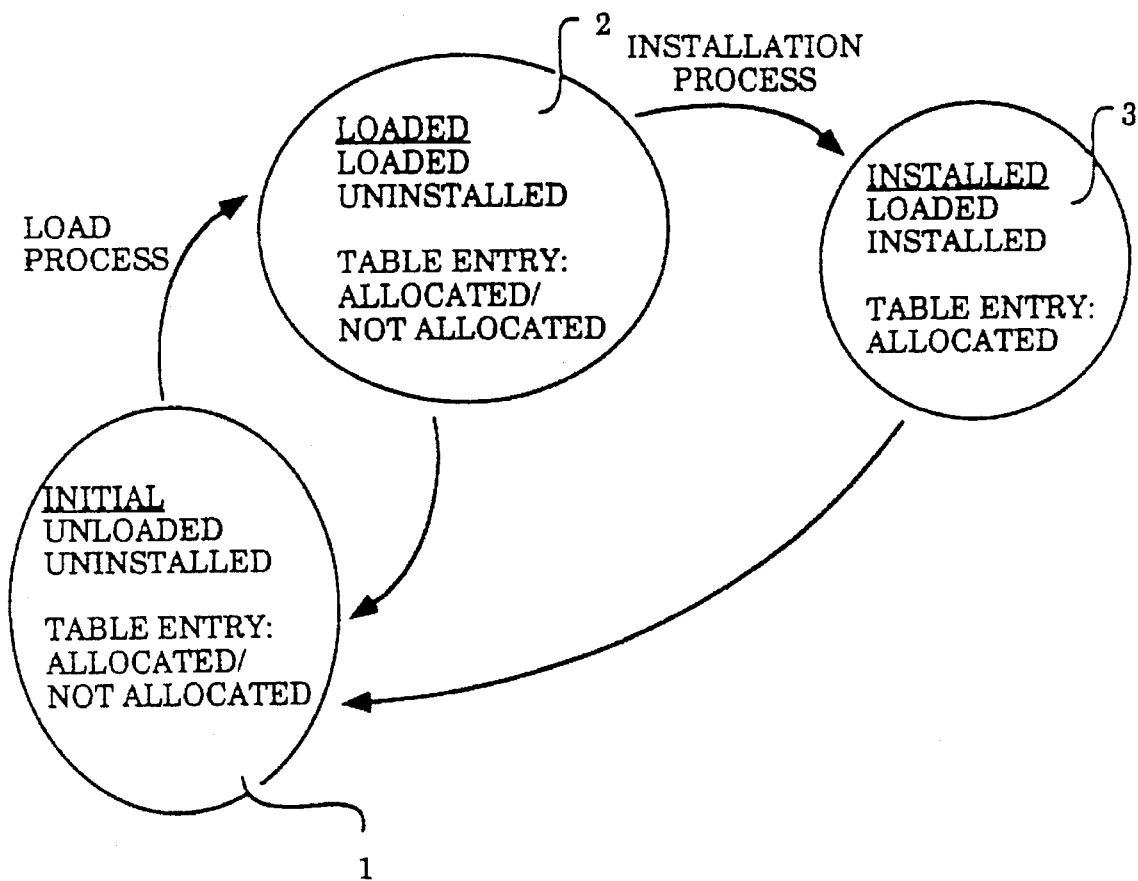
FIG. 1 is a diagram illustrating the states of the modules in the preferred embodiment of the present invention.

Referring to FIG. 1, a module may therefore be in one of three states. Initially the module is not loaded or installed and an entry is not allocated in the configuration table (unless the configuration table has preallocated entries) (1). The module may be loaded but the module is not installed and an entry not allocated in the configuration table (2). An entry for the module may be allocated in the configuration table and filled in with the appropriate information and the module is loaded and installed into the kernel (3). In this state, the module is accessible and the operations the module provides are available to the system. As will be discussed below, an entry in the configuration table may be allocated when a module is first installed. Alternately, for some configuration tables, such as the device driver configuration table, it is advantageous that entries are pre-allocated to correspond to pre assigned identification numbers for each module.

The kernel consists of a plurality of modules which provide the functionality for the operation of the hardware. Modules include device drivers, system call modules, file system modules, streams modules, scheduling classes modules and other miscellaneous modules. These modules are separately compiled and stored. The kernel is initially configured with a basic set of modules. The basic set of modules should comprise at least the module to read modules from a storage device and the module subsystem which loads modules into the kernel memory and links a module to be loaded with the modules existing in the kernel. By only requiring that a basic set of modules is loaded or bound at startup, the binding of the remainder of modules is delayed until the module is needed thereby maintaining flexibility in the system. However, additional modules may be initially loaded according to the user's requirements and specifications. For example, it may be preferable to load the memory management module and certain device driver modules based on the frequency of usage of those modules.

When the system is created, a plurality of module configuration tables are generated and stored in the kernel memory. These configuration tables are grouped according to the type of modules to be loaded into the kernel. For example, there is a configuration table for the device drivers, a configuration table for the system calls, a configuration table for the streams modules and a configuration table for the file systems modules. In the prior art systems in which the modules are statically loaded and bound at startup, these configuration tables are loaded with information regarding each module, including pointers or handles to each module's structure. For example, in the SunOs™ operating system (SunOs is a trademark of Sun Microsystems, Inc.) UNIX kernel, each entry in the device driver configuration table, devopsp, includes a field for the handle to the dev-ops structure. Similarly, the file system configuration table, vfssw, includes a field for the name of the filesystem, a handle to an "init" routine for the filesystem, a handle to the vfsops structure and a lock used for accessing the filesystem.

In the system of the present invention, it is preferred that the entries to the tables identifying the different modules are not statically bound to the module name but are made or allocated on an as-needed basis when the modules are installed into the kernel. However, those module types which require a consistent identification which is accessible by the user are pre-allocated an entry in the configuration table in order to ensure consistent identification or binding across boots and across machines. For example, if the configuration table is one for device driver, "devopsp", the entries for the device drivers are pre-allocated such that the major number for each device driver is consistently assigned. The same requirement exists for system calls; the "sysint" table must consistently identify each system call module by its system call number.

Although the system is not limited as such, it is preferred that once a module is allocated an entry in the configuration table, the entry remains allocated until the system is rebooted.

In each configuration table a predetermined field for each entry in the table is used to identify the state of the module. Preferably a handle field is used. If the configuration table includes multiple handles, it is preferred that the most active handle is utilized to identify the state of the module. If the handle is a predetermined value such as a null value, the module is in an uninstalled state. In order to avoid a de-referencing error which may arise when referring to a null field in the table, it is preferred that the uninstalled state of the module be identified by inserting a predetermined special value indicative of the uninstalled state of the module. For example, the handle is loaded with an address which has been predetermined to indicate that the module is not installed in the kernel. If the module is loaded into the kernel, the handle field will contain a valid handle for the module.

These null or special entries act as flags to the module subsystem to indicate that a module is to be loaded and installed in the kernel. Thus, when code is executed to call a specific module, a check is made to determine if that module is loaded into the kernel, linked with the other modules existing in the kernel memory and installed into the configuration table. If the module is not loaded and installed, the module subsystem will cause the module to be loaded and installed in the kernel before processing continues. If it is determined that the module is installed, the processing in the kernel will continue. Alternately, flags may be incorporated at different locations in the kernel where particular modules are initially called or referenced. An alternate mechanism would then be used to detect the presence of these flags and the state of a module.

Figure 2:
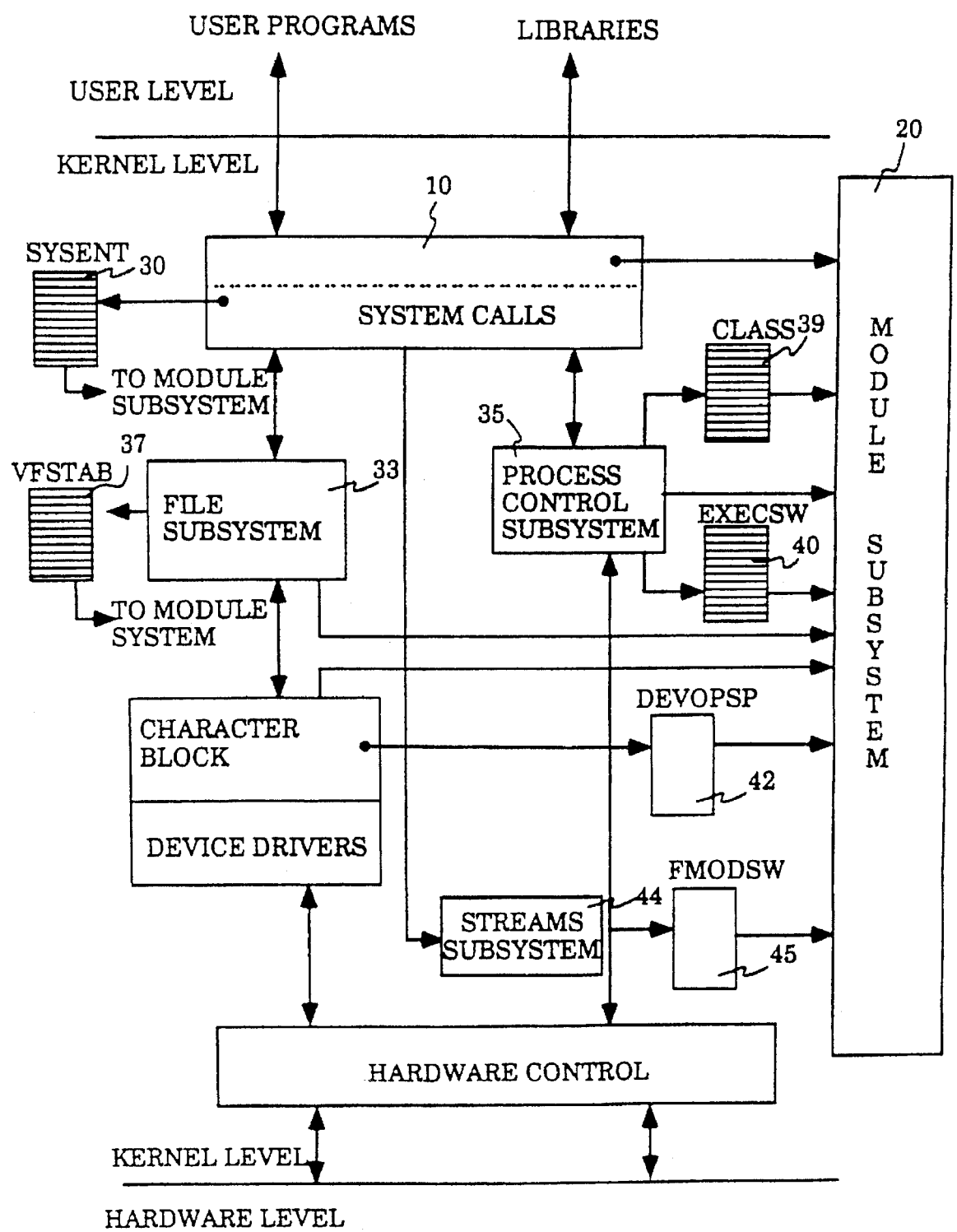
FIG. 2 is a block diagram illustration of the interaction of the module sub-system of the present invention with the kernel.

A module subsystem is provided in the kernel to intercept any calls made to certain modules in the kernel and to determine if the module is currently loaded and installed in the kernel or requires the module to be loaded into kernel memory, linked and installed. A block diagram of an exemplary module subsystem and interaction with the kernel is illustrated in FIG. 2. Module subsystem 10 intercepts each call to a module in order to determine whether or not the module has been loaded into the kernel memory and installed. The module subsystem will also intercept those calls from other modules which call modules in order to determine if the called modules have been loaded and installed. Referring to FIG. 2, user programs and libraries will issue system calls which are received in the kernel by the system call module 10. The module subsystem 20 will determine if the particular call is supported by a module that has been installed in the kernel by examining the system call configuration table system 30. If the module has been loaded and installed, the operations corresponding thereto are performed. Similarly, it follows that if the file subsystem 33 or process control system 35 are required, the installation of the modules are checked by referencing the vfssw table 37 or, in the case of the process control subsystem, class 39 and execsw tables 40. These are examined by the module subsystem 20 to determine whether the module has been loaded and installed. The table devopsp 42 is checked by the module subsystem 20 when a device driver module is required and the table fmodsw 44 similarly is checked by the module subsystem when a streams module is required.

Figure 4:
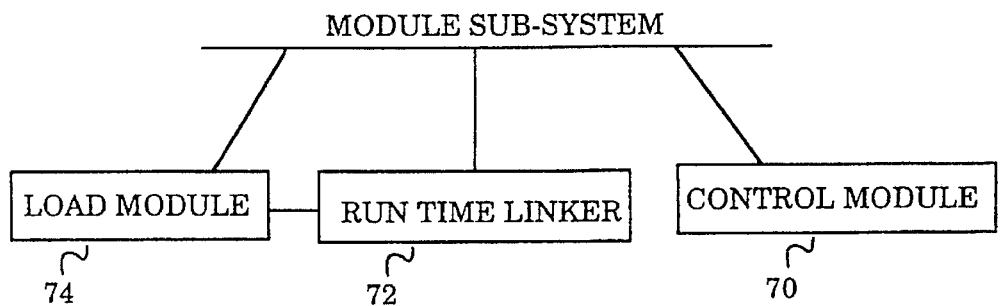
FIG. 4 is an illustration of exemplary module configuration tables.

Referring to FIG. 4, the module subsystem consists of a control module 70, install module 74 and run-time linker 72. The control module 70 intercepts access requests for modules and examines the appropriate module configuration table to determine if the module has been installed in the kernel. The install module 74 causes the module to be loaded and installed into the kernel when the control module 70 determines that a module does not exist in the kernel and the run-time linker 72, called by the module being loaded and installed, resolves references between the modules already existing in the kernel and the module to be loaded.

Figure 3A:
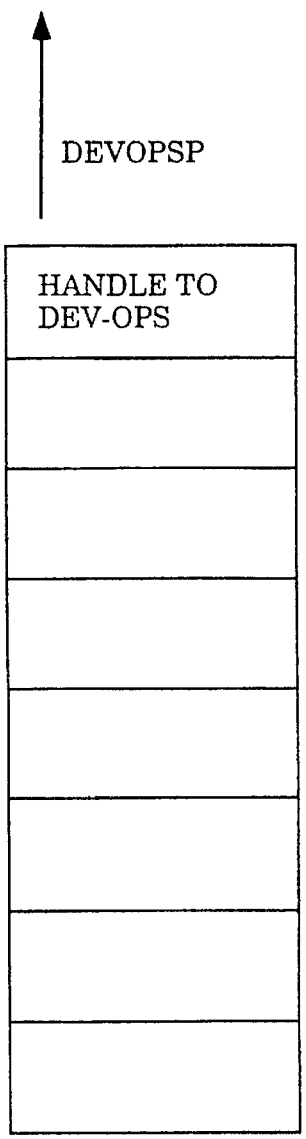
FIG. 3 is a block diagram illustration of the components of the module sub-system.
Figure 3B:
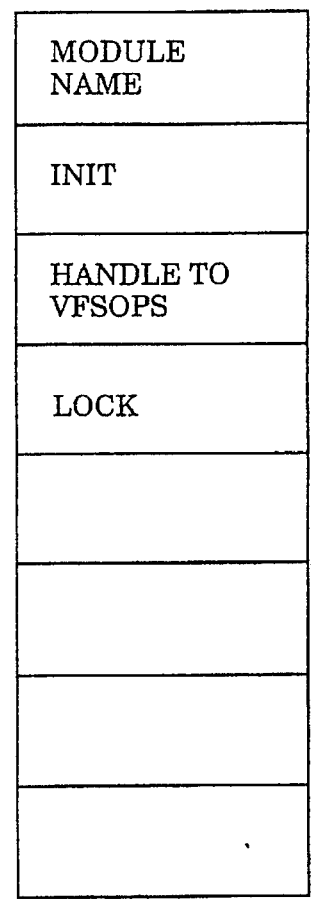

In the preferred embodiment, the module subsystem determines the state of the module by reference to the corresponding module configuration table. Modules are automatically loaded and installed when needed. Modules are needed when the functionality they provide is referred to by name (such as a push of a streams module or the mount of a filesystem) or when a module is needed to satisfy a kernel reference to a function not resident in the kernel. Exemplary configuration tables are shown in FIGS. 3a and 3b. In the preferred embodiment, these tables are located in the kernel memory referenced at a location identified by a particular symbolic or variable name which in turn identifies the type of module (e.g. Fmodsw). For example, the configuration table for the file system modules is identified as "vfssw". The names used and locations the tables are located in are preferably the same as those found in existing UNIX kernels.

Figure 5:
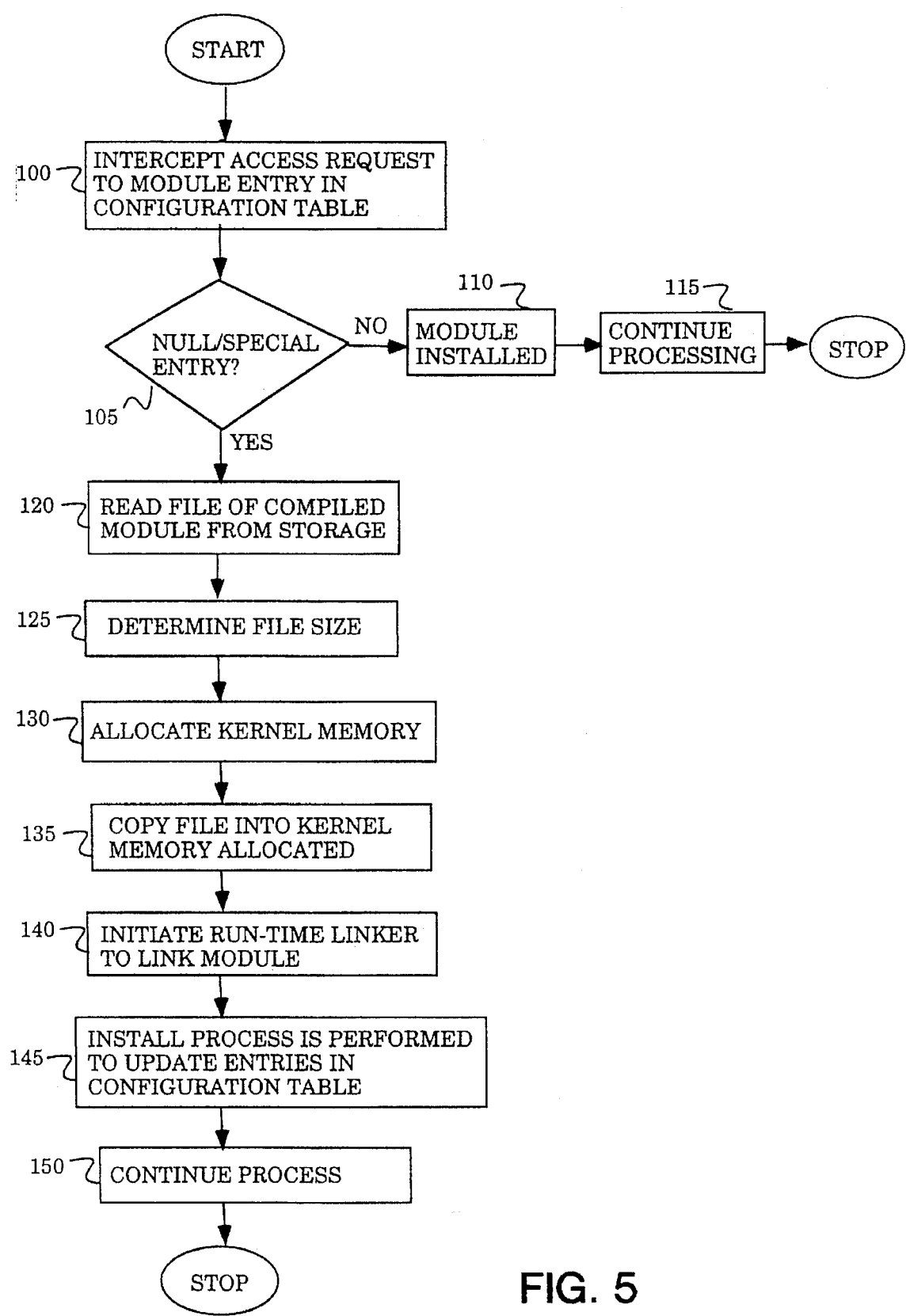
FIG. 5 is a flow diagram illustration of the process of the present invention for dynamically loading modules.

The process for dynamically loading modules in the kernel is illustrated by the flow diagram of FIG. 5. When access to a module is requested and/or attempted access is made to the process table, the module subsystem intercepts the access request, step 100, and checks the table entry for the module to determine if it contains the special predetermined or null entry, step 105, indicative that the module is not installed in the kernel. If it is determined that the module is installed, step 110, because a special or null entry is not present, the module sub-system returns to grant the requesting process access and permits normal processing to continue, step 115. If a null or special entry is present, the control module retrieves from storage the file containing the compiled module, step 120, and examines the file to determine the file size, step 125. Memory is then allocated in the kernel memory for the file, step 130. Preferably this is done using the kernel memory allocator that exists in present UNIX kernels. The file containing the compiled module is then copied into the memory allocated, step 135 and the run time linker provided is initiated to link the module and resolve the references, step 140 with the other modules located in the kernel memory.

The linker fixes references in the code in the module to reference or call the right address. Thus, the linker, using a name of a module to be called, will determine the address in the module where the function resides. This address is then written into the module at the function reference such that when the code is executed, the proper address is identified. Linker technology is well known to those skilled in the art and will not be discussed in detail here. In the preferred embodiment the kernel includes a linker which provides functionality similar to dlopen, dlclose and dlsym implemented in the UNIX filesystem except that only one module is linked at any one time. For information regarding dlopen, dlclose and dlsym, see Sun Microsystems, Inc., SunOs operating system manual pages, "Miscellaneous Library Functions" (1990). Furthermore it is preferred that the linker relocates the module file to a specified address, then allocate common variables and resolve references from the module to the kernel.

As the module is an object file, it may have unresolved references. These references are satisfied when the module is loaded by looking in the kernel symbol table. Therefore, it is preferred that symbols in other modules are not used to resolve these references unless the module specifically states that it requires other modules. This may arise when common code is needed by several different modules. For example, one way to specifically state that other modules are required is by declaring a character array variable "_depends_on" and initializing it with <subdir/filename> pairs of other modules that this module depends on. This functions similarly to the required library list in an executable image which accesses shared libraries. Thus, when a module is loaded, the list of modules in the depends-on variable is loaded first.

There can be no undefined references in the statically linked part of the kernel; therefore, the kernel cannot make direct references to module symbols. A module may contain references to kernel symbols because when a module is loaded the kernel run time linker resolves references from the module to the kernel.

Figure 6A:
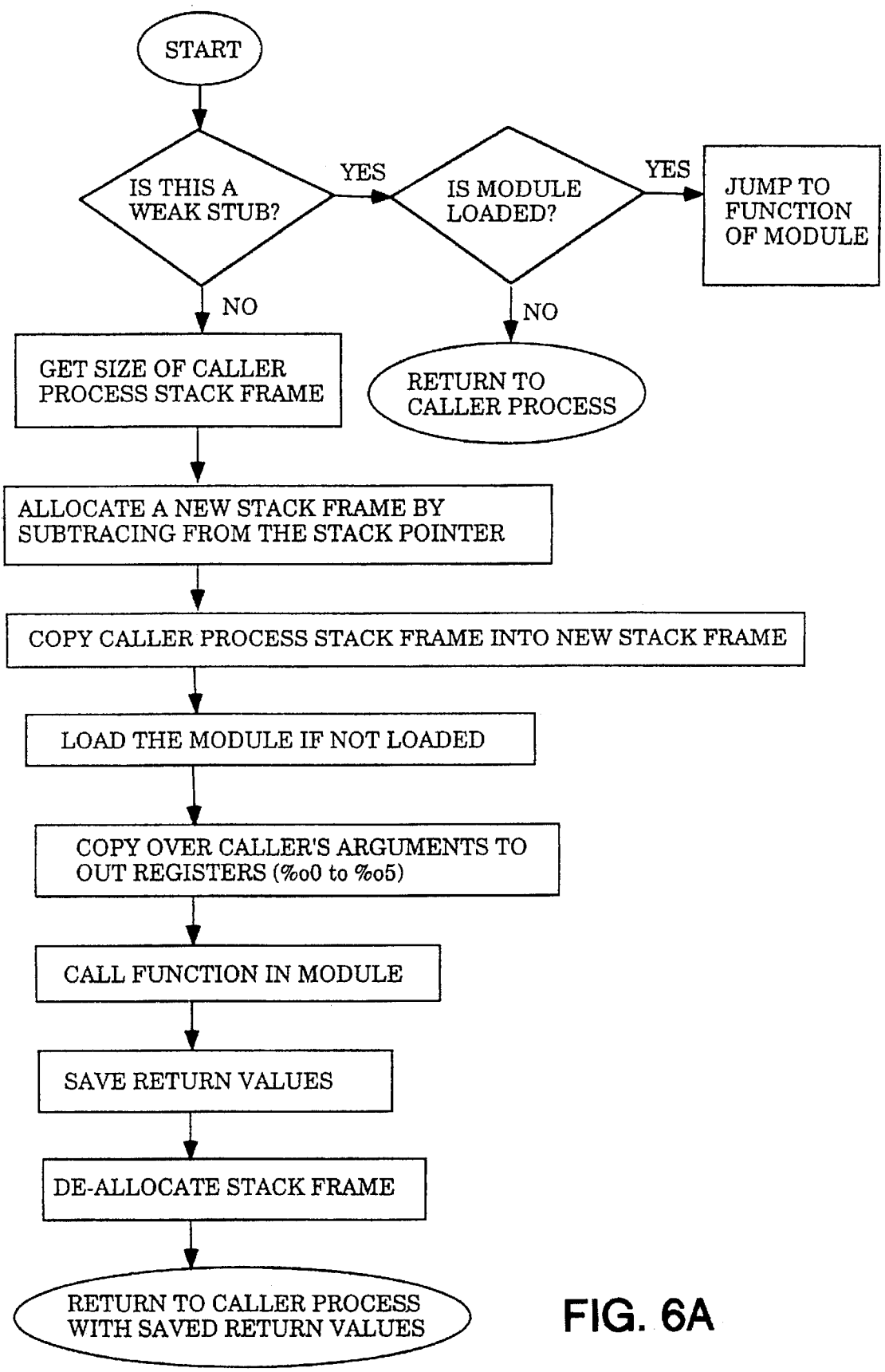
FIG. 6a illustrates the process flow for stubs.

However, there are times when the kernel needs to make references to functions that have been moved out of the resident part of the kernel. For example, the exit() routine in the kernel always calls shmexit() to clean up in case the exiting process was using UNIX system V shared memory. But shmexit() routine is now in a loadable module and not linked with the resident part of the kernel. Therefore, the kernel would receive an undefined symbol if shmexit() isn't defined. The solution is to provide a dummy routine for shinexit() linked with the resident part of the kernel. This routine knows how to load the appropriate module and transfer control to the target routine shmexit() in the module. Such a resident dummy function is called a stub. A stub may be viewed as an indirect addressing function or like a PLT (procedure linkage table) entry but with more flexibility. Alternately, the PLT may be modified to provide the stub functionality. For example, in the SunOs operating system, when control is transferred to the target routine in the module, the stack frames are arranged so it appears that the called routine of the stub made the call directly to the target module routine. Thus the caller's arguments are passed to the target routine. FIG. 6a is a flowchart which illustrates the processing of stubs.

All stubs are defined in a file. They provide a mechanism needed for moving existing functionality out of the kernel and into modules. There are two types of stubs—strong and weak. A strong stub attempts to load a module if necessary and a weak stub does not. In the example above, shmexit() is defined in the kernel as a weak stub. Typically, a weak stub is utilized for modules which indicate a resultant state simply by not being loaded in the kernel. For example, if the shared memory module is not already resident, there are no shared memory segments so there's no need to load the module just to check and find out that there are no shared segments.

Referring to FIG. 6b, two stub data structures are provided, one to describe a module and the other to describe its stub functions. FIGS. 6c-1, 6c-2 and 6c-3 set forth illustrative stub macros used to generate the data structures of FIG. 6b.

Referring back to FIG. 5, once the module is loaded into the kernel memory and linked with the other modules, step 145, the install process is performed in which the configuration table entries for the module loaded are updated to reflect that the module is now located in the kernel memory. If an entry has not been allocated in the corresponding configuration table for the module, an entry is allocated and the information is entered into the fields for that entry. If an entry had been previously allocated for the module, the handle field, currently containing a special or null entry indicative that the module is not loaded into the kernel, is updated to contain the proper handle for that module. Control is then returned to the process intercepted and normal processing continues.

The kernel, through the module sub-system, preferably employs three functions, a function to load and install the module, a function to unload and uninstall the module and a function to request information regarding the state of the module. To maintain flexibility as to the types of modules which may be loaded in the system of the present invention, it is preferred that the kernel calls correspondingly module specific functions to perform the function desired. Therefore, in the preferred embodiment, each module includes a wrapper which functions as an interface between the kernel and the module. The module wrapper defines three functions which are callable by the kernel. The "_init" routine is called with no arguments from the kernel when the module is loaded and install. This routine is responsible for hooking the module into the system. As will be discussed in more detail below, the "_fini" routine is called from the kernel when a request has been made to unload and uninstall a module. The "_fini" routine determines if the module is available to be unloaded and uninstalled, and if it is available to be uninstalled and unloaded, unhooking the module from the system. The "_info" routine is called from the kernel when a request has been made for module information.

A linkage structure, modlinkage, preferably identifies the linkage structures defined in the module. The linkage structures contain the module-specific information for the module. For purposes of explanation, only one linkage structure is defined per module. However, it will be obvious to one skilled in the art that the plurality of linkage structures per module may be defined. An illustrative structure is shown in FIG. 7a. The variable "ml-rev" identifies the revision of the system. If the definition of wrapper is changed, the revision will be changed. This simplifies support of existing modules. The variable "ml_linkage[4] is a null terminated array of pointers to linkage structures. The linkage structure contains information which is used to install and remove the module. A preferred embodiment of the different types of linkage structures are illustrated by FIGS. 7b-1 and 7b-2. The first two elements of the linkage structure contain the same type of information for all modules. The rest of the structure is module specific. FIGS. 7b-1 and 7b-2 reference modules as examples such as those found in the UNIX system kernel.

The modules are compiled into an object code format prior to linking, such as the ELF format (Extensible Linker Format). The compiled modules are located in a predetermined portion of storage or other memory. Each module is identified by a name or handle, which is uniquely associated with the particular module, such as the name of the file system or system call. Some modules are identified by a call number. For example, system calls or device drivers may be identified by a number. Since these numbers are not unique across the different types of modules, it is necessary to provide a unique identifier for these numeric identifiers. Therefore, it is preferred that a table is provided to translate the numeric identifier for a particular type of module into a unique module name which identifies the compiled file representing the module. However, those modules already identified by a unique name, such as the file systems, do not need to be translated and the names employed by the system are used to access the file of the module.

Header information referred to as a "wrapper" is provided with each file to provide certain information regarding the file and the module. An exemplary wrapper for a file system is illustrated in FIG. 8. The wrapper identifies that the file is a loadable module, the type of module, and a pointer to the appropriate installation code for the type of module. The installation code in the kernel provides specific instructions as to the installation of the module in the appropriate configuration table. The wrapper is formed by inserting code into the source code of the module to generate the wrapper information.

For example, FIG. 8 illustrates a wrapper for a filesystem named "device filesystem." The internal name of this type of filesystem is "devfs", the vfssw structure defines an init routine, devfsinit, which contains functions performed when the module is first loaded. The _init, _fini and _info routines are specific for each module. Preferably, as illustrated in FIG. 8, the _init, _fini or _info routines call the module subsystem routines, respectively, mod_install, mod_remove and mod_info with the modlinkage structure for the module passed as parameters.

The structure modlfs is the linkage structure defined for this module. The structure modlfs defines the mod-ops for the file system, "mod-fsops," which includes the pointers to the _init, _fini and _info routines for the modules. The next element of modlfs is a pointer to the name of the filesystem which is displayed in response to information regarding the module. The third element "vfw" identifies the vfssw structure via the handle the module exports to the kernel.

The next two lines of the wrapper define the module linkage structure and identifies the revision of the system, "modrev_1" and the single linkage structure "modlfs". The remaining elements of the wrapper include pointers to the module-specific init, fini and info routines.

FIGS. 9a-9e are exemplary characters driver configured to operate on a Sun Microsystems, Inc. SPARCstation workstation (SPARCstation is a registered trademark of SPARC International) running under Sun Microsystem's UNIX operating system.

Therefore, through the system of the present invention, modules are loaded and installed on an as needed basis. This decreases the amount of kernel memory required for a system, particularly for those users who utilize a small, generic set of modules. For those users that use additional modules, only those required are loaded. In addition to reducing kernel memory consumption, the kernel can be configured without rebooting and the reconfiguration of the kernel is greatly simplified.

When a module is installed, it exports a handle to services it provides. When it is uninstalled, it unexports the handle. The handle which a driver module element exports when it installs itself is a pointer to its dev_ops structure. Preferably general driver routines, mod_installdrv() and mod_removedrv(), are provided for easy implementation of driver specific install and remove (on "uninstall") operations.

The function of mod_installdrv() is to install a driver module element in the system. This is done by setting the devopsp entry corresponding to the driver's major number to point to the dev_ops structure of the driver. The major number of the driver is allocated when the module containing the driver is installed onto the storage medium (i.e. the hard disk).

The function of mod_removedrv() is to uninstall a driver module element from the system. This is done by setting the devopsp entry corresponding to the driver's major number to point to the mod_nodev_ops structure (a special address used to indicate that the module is not installed) and removing reference to the driver from any kernel data structures, such as the dev_info structure. If the driver is not uninstallable, mod_removedrv() returns EBUSY.

A driver is not uninstallable if its detach routine fails when invoked for any dev_info node owned by the driver or its dev_ops are being held for use by the system. The driver's detach routine is responsible for returning a value other than DDI_SUCCESS is the driver is busy for any other reason, e.g. that it is open, or that there is an outstanding callback to the driver.

The handles which an exec system module exports when it installs itself are its magic number, a pointer to its exec function, and a pointer to its core function (i.e., the first three fields of an execsw structure). Preferably general exec routines, mod_installexec() and mod_removeexec(), are provided for easy implementation of exec specific install and remove operations.

The function of mod_installexec() is to install an exec module element in the system. This is done by allocating an available entry in the execsw table and setting the exec_magic, exec_func and exec_core fields of that entry to those contained in the execsw structure pointed to in the module element's modlexec structure. The function of mod_removeexec() is to uninstall an exec module element from the system. This is done by setting the exec_magic, exec_func, and exec_core fields of the allocated entry to NULL.

Access to an exec's exported handles is protected by a read/write lock in the execsw entry which the module element allocates when it is installed. A write lock is obtained when the handles are being exported or unexported, and a read lock is held during calls to the module element's exec_func() and exec_core() entries. An exec is therefore not uninstallable if the read_write lock contained in the corresponding execsw entry cannot be entered for writing.

The handles which a filesystem system module exports are its name, vsw_init() function, vsw_flag, and vfsops (i.e., the fields of a vfssw structure). Preferably general filesystems routines, mod_installfs() and mod_removefs(), are provided for easy implementation of filesystem specific install and remove operations.

The function of mod_installfs() is to install a filesystem module element in the system. This is done by finding the vfssw table entry which has been allocated to it by the framework and setting the vsw_init, vsw_vfsops and vsw_flag fields of that entry to those contained in the vfssw structure pointed to in the module element's modlfs structure. The function of mod_removefs() is to uninstall a filesystem module element from the system. This is done by setting the vsw_init and vsw_vfsops fields of the allocated vfssw entry to NULL and the vsw_flag field to zero.

Access to all filesystems' exported handles is protected by a single read/write lock. The write lock is held while allocating vfssw entry, while writing to the vfssw entry, and while checking the list of mounted filesystems in mod_removefs() to determine if a filesystem is unloadable. The read lock is held while searching the vfssw and across invocation of the filesystem's vsw_init(), vfs_mount(), vfs_sync(), and vfs_unmount() functions. The framework will therefore prevent a filesystem from being uninstalled when there is an active thread of execution in the vsw_init(), vfs_mount(), vfs_sync(), and vfs_unmount() functions, and the filesystem prevents itself from being uninstalled when it is otherwise busy.

The handles which a scheduler module element exports are its class name, class initialization function, and its class functions (i.e., the first three fields of a class structure). Preferably general routines, mod_installsched() and mod_removesched() are provided for easy implementation of scheduler specific install and remove operations. The function of mod_installsched() is to install a scheduler module element in the system. This is achieved by locating the entry in the class table corresponding to the scheduler (allocating one if necessary), and setting the cl_init and cl_funcs fields to those contained in the class structure pointed to by the module element's modlsched structure and then calling dispinit() to initialize the class. The cl_name and cl_lock fields are initialized when the class entry is allocated. The function of mod_removesched() is to uninstall a scheduler module element from the system. This is done by setting the cl_init and cl_funcs fields of the allocated entry to NULL.

Access to the scheduler's exported handles is protected by a read/write lock allocated per scheduler class. The lock is allocated and initialized when the class entry is allocated. The lock is held for writing the class entry in mod_installsched() and mod_removesched(); the lock is also held for reading.

The handle which a streams module element exports is a pointer to its streamtab. Preferably general routines mod_installstrmod() and mod_removestrmod(), are provided for easy implementation of streams specific install and remove operations.

The function of mod_installstrmod() is to install a streams module element into the system. This is done by allocating an entry in the fmodsw table or locating the entry already allocated to the streams module, and initializing the f_str and f_flag fields with the values contained in the fmodsw structure pointed to by the module's modlstrmod structure. The f_name and f_lock fields are initialized when the fmodsw entry is allocated. The function of mod_removestrmod() is to uninstall the streams module element from the system. This is done by setting the f_str field of the allocated fmodsw entry to NULL and the f_flag field to zero.

Access to the stream's exported handle is protected by a read/write lock in the fmodsw table entry. The write lock is held while writing to the entry in mod_installstrmod() and mod_removestrmod(). The read lock is held during calls to the stream's qi_open() and qi_close() routines.

The handle which a system call module element exports is a pointer to a function. Preferably general routines mod_installsys() and mod_removesys() are available for easy implementation of system call module specific install and remove operations.

The function of mod_installsys() is to install a system call module element into the system. This is done by locating the sysent entry allocated to this system call and setting the sy_narg and sy_call fields of the entry equal to those contained in the sysent structure pointed to by its modlsys structure. Sysent entries are allocated to system calls at boot time. The function of mod_removesys() is to uninstall a system call module element from the system. This is done by setting the sy_call field of the allocated sysent entry to the address of the nosys functions, and the value of the sy_nargs field to zero.

Access to the system call's exported handle is protected by a read/write lock in the sysent entry. The write lock is held while writing to the sysent structure in mod_installsys() and mod_removesys(), and the read lock is held across invocations of the sy_call function.

To further optimize usage of kernel memory while providing a system with sophisticated functionally, it is preferred that a system is provided with a process which unloads modules. Although other techniques such as manual unloading of modules may be used, it is preferable that the innovative system of automatically unloading modules described below is utilized.

When it is desirable to gain more kernel memory, the module sub-system is called to unload modules. Although many different rules may be applied to determine when it is necessary as desirable to free up kernel memory, it is preferable that modules are unloaded when insufficient memory exists to load additional modules. Preferably, this is accomplished by modifying the kernel paging mechanism found in prior art systems (referred to as the "swapper") to notify the module subsystem to uninstall and unload any modules which are currently not utilized. The auto unload module of the module subsystem requests each loaded module to indicate whether or not the module can be uninstalled and unloaded. The module calls a function, fini, located in the wrapper of each module. The fini function checks the status of the module using criteria for that type of module.

The module and the system, i.e., kernel, together determine whether the module can be unloaded and uninstalled. Generally, it can be said that a module is uninstallable and unloadable if it is not in use. In particular, when a module is installed, it exports a handle to services it provides. When it is uninstalled, it unexports the handle. Thus, the system accesses the handle of each module in order to access the operations of the module. If the handle is being accessed by the system then the module is in use and cannot be uninstalled. Other criteria may exist depending upon the type of module. In addition, a locking mechanism, such as a semaphore, may be employed to specifically identify the state of use of the module. Thus, the system would include routines to generate the lock, remove the lock and check the status of the lock to determine if the lock can be removed.

For example, if the module is a driver, the system keeps track of what drivers are opened. If a driver is opened, the driver is not uninstallable. If the driver is not opened, a check is then made to determine if the driver can be detached from the devices it is attached to. The detach routine performs the opposing function to the attach routine presently available in the UNIX operating system. The detach routine is then executed with respect to all devices the driver is currently attached to. If any detach routine fails, which would occur if the device is currently utilizing the driver, all devices for that driver remain attached and the driver is identified as not being uninstallable.

Preferably a module table is provided in the kernel. The module table identifies each module, the status of the lock on each module (i.e., locked, unlocked) and the status of the module (e.g., loaded/unloaded/loading-in-process, etc.). Service routines would then be provided to maintain and access the information in the module table.

If the module indicates to the autounload module that the module can be uninstalled, the autounload module nullifies the appropriate configuration table entries. Preferably, this is achieved by inserting a null or special value in the handle referred to by the module subsystem to determine the state of the module. An unload function is then performed whereby the memory occupied by the module is then reallocated thereby freeing up the memory space in the kernel.

Preferably the corresponding entries in the configuration table remain allocated while the module is in its uninstall state. The amount of memory required in the configuration table is relatively minimal and the maintenance of the entries is minimized by eliminating the steps of deallocating and reallocating entries in the table.

In an alternate embodiment, a two step removal process is employed in order to minimize the frequency of loading and unloading modules. A module determined to be available to be uninstalled and unloaded is first uninstalled. When kernel memory is subsequently needed, the modules which are still loaded but not installed will be unloaded to free up space in the kernel. Similarly, it follows that other modules will be uninstalled, but will remain loaded, for the next time kernel memory is needed. If a module is uninstalled but is loaded and access to the module is required, the install process is simply performed to provide access to the module.

A number of advantages are realized in this process. Thrashing is minimized. The amount of time required to access a module is minimized as unload operations are performed only when necessary, thereby decreasing the frequency of performing time consuming load operations. Furthermore, the two step process may be employed with a memory-replacement algorithm, such as a least-recently-used (LRU) algorithm, to further optimize the utilization of the load/install and uninstall/unload processes.

Although the invention has been described in the context of the preferred embodiment, it is evident that numerous alternatives, modifications, variations and uses will be apparent to those skilled in the art in light of the foregoing description. In particular, it is apparent that system of autoloading of modules may be used together with or independently of the system for auto unloading modules described herein and still realize benefits in the kernel memory usage.

We claim:

1. A computer system comprising a central processing unit (CPU) and memory, said CPU executing in accordance with an operating system comprising modules of code, said computer system comprising a module sub-system for dynamically loading modules of the operating system into operating system memory and installing loaded modules as part of the operating system for access, said subsystem comprising:

a control module loaded into operating system memory and installed as part of the operating system, said control module intercepting a request for access to a module such that the request is not performed, said control module further determining whether the requested module has been loaded and installed;

a loader module loaded into operating system memory and installed as part of the operating system, said loader module coupled to the control module for copying compiled module code for the requested module into the operating system memory to provide a loaded module;

a linker module loaded into operating system memory and installed as part of the operating system, said linker module coupled to the control module for resolving the references between the loaded module and at least one module previously loaded in the operating system memory and installed;

an install module loaded into operating system memory and installed as part of the operating system, said install module coupled to the control module for providing references to the loaded module thereby indicating that the loaded module is a loaded and installed module;

if said control module determines that the requested module has not been loaded and installed, said control module controlling the loader module, linker module and install module respectively to load, link and install the requested module, said control module further permitting the request for access to execute once the requested module has been loaded and installed; and if said control module determines that the requested module has been loaded and installed, said control module immediately permitting the request for access to execute.

2. The computer system as set forth in claim 1, wherein the operating system further comprises at least one module configuration table comprising information regarding modules, said control module reading the module configuration table to determine whether the requested module has been loaded into the operating system memory and installed.

3. The computer system as set forth in claim 2, wherein each requested module comprises a wrapper to provide information indicating whether the module is a loadable file, a type of module, and a pointer to installation code located in the operating system for the type of module, said installation code providing specific instructions as to the installation of the module information in the configuration table.

4. The computer system as set forth in claim 1, wherein said module configuration table comprises a record for each module, each record comprising at least one entry having a value indicating that the module is loaded in the operating system memory and installed.

5. The computer system as set forth in claim 1, wherein said loader module determines the size of a file of compiled module code, allocates operating system memory for placement of the file and writes the file in the memory allocated.

6. The computer system as set forth in claim 5, wherein if the loader module determines that insufficient operating system memory exists to write the file, a module is unloaded from the operating system to provide sufficient operating system memory.

7. The computer system as set forth in claim 4, wherein the control module determines if the requested module is loaded and installed by determining if the predetermined entry in the record contains a value indicative that the module is loaded into the operating system and installed.

8. The computer system as set forth in claim 4, wherein said install module allocates a record in said module configuration table for the requested module when the requested module is first loaded into the operation system memory and installed.

9. The computer system as set forth in claim 4, wherein a record in the module configuration table is preallocated for each module that can be loaded and installed.

10. The computer system as set forth in claim 4, wherein the install module establishes a record in the module configuration table for the loaded module when the loaded module is first installed in the operating system, said record comprising the entry containing the value indicative that the loaded module is installed in the operating system.

11. The computer system as set forth in claim 4, wherein a plurality of modules are loaded and installed and said module subsystem further comprises:

means for selecting a loaded and installed module to unload and uninstall from the operating system;

means for nullifying the entry, that indicates that the selected module is loaded in the operating system and installed, in the module configuration table such that the entry in the module configuration table indicates that the selected module is no longer loaded or installed;

means for reallocating the operating system memory occupied by the selected loaded and installed module to unload such that the memory can be utilized to load another module into the operating system.

12. The computer system as set forth in claim 10, wherein said control means determines if the requested module is loaded and installed by determining if a record exists for the requested module in the module configuration table and if a record exists, if the entry in the record contains the value indicative that the module is loaded and installed in the system.

13. In a computer system comprising resources such as a Central Processing Unit (CPU), memory and input/output means, an operating system which executes processes and utilizes the resources, the operating system comprising at least one module loaded into operating system memory and installed as part of the operating system, a process for dynamically configuring the operating system by loading the modules into operating system memory and installing the loaded modules on an as needed basis comprising the steps of:

when a requesting process issues a request to the operating system to access a requested module;
a module subsystem intercepting the request to access the requested module such that the request is temporarily not executed by the operating system, and
determining if the requested module has been loaded and installed into the operating system by determining if a module configuration table stored in operating system memory contains an entry for the requested module having a value indicative that the requested module has been loaded into the operating system memory and installed;

if the module has not been loaded into the operating system memory and installed into the operating system, loading the module comprising the steps of;
copying compiled module code of the requested module into the operating system memory such that the requested module is a loaded module, and
resolving all references between the loaded module and the at least one loaded and installed module,
installing the loaded module by providing references to the loaded module necessary for requests for access thereby indicating that the requested module has been loaded and installed, wherein the loaded module is now accessible, and
permitting the intercepted request for access to process; and if the module has been loaded into the operating system memory and installed into the operating system, immediately executing the request for access to execute.

14. The process for dynamically configuring an operating system as set forth in claim 13 wherein a record is allocated for a module when a modules is first loaded and installed, said step of determining further comprising the step of ascertaining whether a record for the requested module exists, wherein if a record for the requested module does not exist or if a record for the requested module exists and the entry indicates the requested module is not loaded and installed, the module is loaded and installed.

15. The process for dynamically configuring an operating system as set forth in claim 13, further comprising the steps of:

selecting a loaded and installed module to unload and uninstall from the operating system;

nullifying the entry for the selected module in the module configuration table to indicate that the selected module is uninstalled; and reallocating the operating system memory occupied by the selected module to unload such that the memory can be utilized to load another module into the operating system.

16. The process for dynamically configuring an operating system as set forth in claim 13, further comprising the steps of:

selecting a module to unload from the operating system, said module being in an uninstalled state, as indicated by a null entry in the entry for the selected module in the module configuration table; and reallocating the operating system memory occupied by the selected module to unload such that the memory can be utilized to load another module into the operating system.

17. The process for dynamically configuring an operating system as set for in the claim 16 wherein said process further comprises the step of uninstalling at least one installed and loaded module according to predetermined parameters by nullifying the entry for the installed and loaded module in the module configuration table.

18. In a computer system comprising resources such as a Central Processing Unit (CPU), memory and input/output means, an operating system comprising a kernel memory comprising a plurality of installed and loaded modules which execute processes and utilize the resources, a process for loading modules into the kernel memory on an as needed basis comprising computer implemented steps of:

compiling each module into an object code format;

storing the compiled files representative of the modules in a memory external to the kernel memory;

providing at least one module configuration table in the kernel memory identifying modules loaded into the kernel memory and installed into the kernel as part of the operating system;

when a requesting process issues an access request for a requested module, said process for loading, intercepting the access request to the module configuration table;

reviewing the entries in the module configuration table to determine if the requested module has been loaded and installed into the kernel, if the module configuration table indicates that the module has not been loaded and installed into the kernel, reading the compiled file representative of the module, determining the size of the file, allocating space in the kernel memory for the file, copying the file into kernel memory, resolving all references between the requested module and the loaded and installed modules, installing the module by identifying the location of the loaded module and updating the module configuration table to indicate that the module has been loaded and installed into the kernel, and permitting the request to access to execute; and if the module configuration table indicates that the module has been loaded and installed into the kernel, immediately permitting the request to access to execute.

* * * * *